United States Patent [19]

Ohlinger et al.

[11] 4,340,494

[45] Jul. 20, 1982

[54] PROCESS FOR THE MANUFACTURE OF FERROMAGNETIC CHROMIUM DIOXIDE

[75] Inventors: Manfred Ohlinger, Frankenthal; Guenter Väeth, Limburgerhof; Norbert Mueller, Friedelsheim; Eugen Wettstein, Germersheim, all of Fed. Rep. of Germany

[73] Assignee: BASF Aktiengesellschaft, Fed. Rep. of Germany

[21] Appl. No.: 199,347

[22] Filed: Oct. 21, 1980

[30] Foreign Application Priority Data

Oct. 22, 1979 [DE] Fed. Rep. of Germany ....... 2942646

[51] Int. Cl.³ .................... C01G 37/027; H01F 1/36
[52] U.S. Cl. .............................. 252/62.56; 252/62.51; 423/607
[58] Field of Search .................. 252/62.51, 62.56; 423/607

[56] References Cited

U.S. PATENT DOCUMENTS 3,034,988  5/1962  Ingraham et al.
3,117,093  1/1964  Arthur et al. .................... 252/62.51
3,278,263  10/1966  Cox .................................. 252/62.51
3,687,851  8/1972  Hartmann et al. ............... 252/62.51

FOREIGN PATENT DOCUMENTS 2022820  1/1972  Fed. Rep. of Germany .
  51-313  1/1976  Japan .............................. 252/62.51
6617476  6/1967  Netherlands .

OTHER PUBLICATIONS

Kirk–Othmer, "Encyclopedia of Chemical Technology", vol. 2, 1963, pp. 573–574.

Primary Examiner—Jack Cooper
Attorney, Agent, or Firm—Keil & Witherspoon

[57] ABSTRACT

A process for the manufacture of ferromagnetic chromium dioxide modified with foreign elements, by reacting oxides of trivalent and hexavalent chromium under superatmospheric pressure at an elevated temperature in the presence of water and of antimony(III) oxide as modifier, with or without other modifiers in an amount not exceeding 15% by weight, wherein the antimony(III) oxide employed as modifier is, to the extent of more than one-third, present as the senarmontite cubic modification, has a specific surface area, measured by the BET method, of from 1.5 to 15 m²/g, and is added in a total amount of up to 0.5% by weight, based on the resulting chromium dioxide.

4 Claims, No Drawings

PROCESS FOR THE MANUFACTURE OF FERROMAGNETIC CHROMIUM DIOXIDE

The present invention relates to a process for the manufacture of highly coercive chromium dioxide which is modified with foreign elements.

A number of processes have been disclosed in which, to prepare ferromagnetic chromium dioxide, the starting material used consists of chromium oxides or mixtures of chromium oxides of average valency not less than 4 and the process is carried out under superatmospheric pressure at an elevated temperature, in the presence of water. It has also been disclosed in several publications that modifying such a chromium dioxide with a number of metals makes it possible to improve the magnetic properties of the end product. For example, U.S. Pat. No. 3,034,988 describes the production of an improved chromium dioxide by reacting chromium trioxide in the presence of a metal of atomic number 22–28 or of a compound thereof, and of an element of group V of the periodic table, in the presence or absence of water, at from 300° to 500° C. under a pressure of up to 2,940 bar. The materials thus obtainable have a coercive force of not more than 34 kA/m. According to a further process disclosed in Netherlands Laid-Open Application No. 6,617,476, chromium oxides or mixtures thereof having an average valency of the chromium of not less than 4 are heated, in the presence of alkali metal dichromates and of prior art modifiers, at from 350° to 500° C. under a pressure of from 245 to 980 bar. However, the resulting product only has a high coercive force if the reaction pressure is at the top of the stated range. Further, it is a disadvantage of this process that the starting material required is chromium(III) oxide, which is expensive to produce.

Further, German Pat. No. 2,022,820 discloses that chromium dioxide having a high coercive force is obtained if, in a conventional process antimony, selenium or tellurium or their compounds are added as a first modifier, and iron in the form of acicular crystals and/or acicular iron oxide particles is employed as a second modifier. The amount of iron employed is from 0.1 to 10% by weight and the total amount of modifiers is up to 25% by weight.

Even though these and other similar prior art processes make possible the production of ferromagnetic chromium dioxides having a high coercive force, a high proportion of modifier is required in most cases. These large amounts of additive impair the magnetic properties, and produce a crystallite size which in particular when the chromium dioxides are used to produce magnetic recording media, has adverse effects on the electroacoustic properties.

It is an object of the present invention to provide a process for the manufacture of ferromagnetic chromium dioxides having a high coercive force, while reducing the amount of modifier required.

We have found that, surprisingly, this object is achieved and that ferromagnetic chromium dioxides may be produced by reacting oxides of trivalent and hexavalent chromium under superatmospheric pressure at an elevated temperature in the presence of water and of antimony(III) oxide as modifier, with or without other modifiers in an amount not exceeding 15% by weight, if the antimony(III) oxide employed as modifier is, to the extent of more than one-third, present as the senarmontite cubic modification, has a specific surface area, measured by the BET method, of from 1.5 to 15 $m^2/g$, and is added in a total amount of up to 0.5% by weight, based on the resulting chromium dioxide.

In an advantageous embodiment of the process according to the invention, the antimony(III) oxide employed as modifier consists to the extent of at least 98% of senarmontite having a specific surface area, measured by the BET method, of from 3 to 10 $m^2/g$, and is employed in an amount of from 0.1 to 0.5% by weight, based on the resulting chromium dioxide. The co-use of iron, specifically in the form of acicular iron oxide particles, as the second modifier for the process according to the invention has proved particularly advantageous.

The invention is applicable to conventional processes for the manufacture of ferromagnetic chromium dioxide under superatmospheric pressure and at an elevated temperature, in the presence of water. For example, water is introduced into a reaction vessel, chromic acid is then introduced whilst stirring and the modifier(s) is/are added in accordance with the invention. Chromium(III) oxide is then added, with continued stirring, in the stoichiometric amount required for the synproportionation reaction. The chromium dioxide forms when the mixture is subsequently treated in a high-pressure reactor at from 100 to 700 bar and from 200° to 600° C. After from 10 to 50 hours, the chromium dioxide is mechanically removed from the reaction vessel, which has been placed in the high-pressure reactor for the reaction, after which it may or may not be surface-stabilized in a conventional manner by treatment with a reducing agent in an aqueous phase. The chromium dioxide thus produced consists of acicular particles having an average length of from 0.1 to 2.0 $\mu m$, especially from 0.4 to 0.9 $\mu m$, a length/width ratio of 15:1 and a specific surface area, measured by the BET method, of from 7 to 40 $m^2/g$.

If the modifier employed in this process is antimony(III) oxide, namely a conventional modifier, the surprising effect according to the present invention is achieved by the cubic modification of antimony(III) oxide, namely senarmontite. To be able to achieve this effect, tthe antimony(III) oxide must consist to the extent of more than one-third, and advantageously of at least 98%, of this cubic modification instead of the rhombic modification, namely valentinite. While developing the novel process, we have found that, to achieve the object of the invention in respect of reducing the proportion of modifier required to achieve a high coercive force, it is necessary that the specific surface area of the senarmontite should be from 2.5 to 15, especially from 3 to 10, $m^2/g$.

A further improvement can be achieved if acicular iron oxide particles in the form of alpha-FeOOH or gamma-$Fe_2O_3$ are added, preferably in an amount of from 0.5 to 15% by weight based on the resulting chromium dioxide, as a second modifier to the reaction mixture, as is conventional.

Surprisingly, the modification process according to the invention gives a chromium dioxide which in spite of the small amounts of added antimony(III) oxide, namely less than 0.5% by weight and preferably from 0.1 to 0.5% by weight, and in spite of a total amount of second modifier of up to 15, especially from 0.5 to 5, % by weight, in each case based on end product, has a coercive force in excess of 35 kA/m.

The advantageous properties of a chromium dioxide produced according to the invention manifest themselves in particular when the latter is used as a magnetic material for the production of magnetic recording media.

To produce the magnetic coating, from 2 to 5 parts by weight of chromium dioxide are processed in a conventional manner into a dispersion with one part of the binder or binder mixture and the appropriate dispersants, lubricants and further conventional additives in a total amount of up to 10% by weight of the chromium dioxide. The dispersion obtained is filtered and is applied by means of conventional coating equipment, for example a knife coater, as one or more thin layers to a non-magnetic base, or as one thin layer to a magnetic recording medium already carrying a different magnetic layer. As a rule, the chromium dioxide particles in the layer which has been applied are next oriented magnetically before the fluid coating mixture is dried on the base, the drying requiring from 2 to 5 minutes at from 50° to 90° C. if a thermoplastic base, for example a film, has been coated. By passing the coated base between heated and polished rollers, preferably at from about 60° to 90° C., magnetic layers which in general have a thickness of from 1.5 to 12 μm, and especially from 3 to 8 μm, can be produced.

The polymeric binders usable for the above purposes may be of a conventional type, for example vinyl chloride copolymers, acrylate copolymers, polyvinylacetals, eg. polyvinylformal or polyvinylbutyral, relatively high molecular weight epoxy resins, polyurethanes and mixtures of these and similar binders. Elastomeric and virtually isocyanate-free linear polyester-urethanes, which are soluble in a volatile organic solvent, have proved advantageous; these may be obtained by reacting a polyester, itself obtained from an aliphatic dicarboxylic acid of 4 to 6 carbon atoms, eg. adipic acid, and one or more aliphatic diols of 3 to 10 carbon atoms, eg. 1,2- or 1,3-propylene glycol, 1,4-butanediol, diethylene glycol, neopentylglycol or 1,8-octanediol, with a diisocyanate of 6 to 24, and especially of 8 to 20, carbon atoms, eg. toluylene diisocyanate or 4,4'-diisocyanatodiphenylmethane, preferably in the presence of a minor amount of a glycol of 4 to 10 carbon atoms, eg. 1,4-butanediol, which acts as a chain extender. Polyester-urethanes obtained from adipic acid, 1,4-butanediol and 4,4'-diisocyanatodiphenylmethane are preferred. Preferably, the polyester-urethanes have a Shore A hardness of from 70 to 100, a tensile strength of from 400 to 420 kp/cm$^2$ and an elongation of from about 440 to 560%. Polymeric binders based on a copolymer of from 70 to 95, especially from 75 to 90, % by weight of vinyl chloride and from 5 to 30, especially from 10 to 25, % by weight of an alkyl ester, alkyl preferably being of 1 to 3 carbon atoms, of an olefinically unsaturated carboxylic acid of 3 to 5 carbon atoms, eg. acrylic acid, methacrylic acid and maleic acid, have also proved very suitable. Amongst these, the copolymers of vinyl chloride with one or more di-$C_1$-$C_3$-alkyl maleates, eg. copolymers of from 70 to 90% by weight of vinyl chloride, from 5 to 15% by weight of dimethyl maleate and from 5 to 15% by weight of diethyl maleate, deserve special mention. The K value, determined by the method of H. Fikentscher (Cellulosechemie, 30 (1931), 58 et seq.) of the particularly suitable copolymers is from 40 to 60.

The magnetic recording media produced using the chromium dioxide prepared according to the invention exhibit the well-known good electroacoustic and, where relevant, video characteristics of conventional chromium dioxide magnetic tape. In addition, however, they have a particularly high signal-to-noise ratio and a particularly high signal-to-printthrough ratio. As a result of the high signal-to-noise ratio, the dynamic range of the tapes for both low and high frequencies is particularly high. As a result, they exhibit substantial advantages over conventional chromium dioxide tapes.

The Examples and Comparative Experiments which follow illustrate the invention. Parts and percentages are by weight, unless stated otherwise. Parts by volume bear the same relation to parts by weight as the liter to the kilogram.

EXAMPLE 1

2.25 liters of water are introduced into a reaction vessel having a capacity of 4 liters. 5.68 kg of chromium trioxide ($CrO_3$) are added, whilst stirring. After 10 minutes, 11.94 g (ie. 0.15% by weight, based on chromium dioxide) of antimony(III) oxide (containing 98% by weight of senarmontite and having a specific surface area of 3.2 m$^2$/g) and 23.88 g (0.30% by weight, based on chromium dioxide) of acicular gamma-$Fe_2O_3$ are added. 2.88 kg of chromium(III) oxide are then introduced, with constant stirring. After further stirring for 20 minutes, the reaction vessel is fitted into an autoclave and the latter is heated at 270° C. for 15 hours. This results in the formation of chromium dioxide. As a result of the oxygen additionally produced, the pressure rises and when it reaches 450 bar is kept constant by a relief valve. After a temperature/pressure cycle of 270° C. and 450 bar for 15 hours the reactor is cooled over 8 hours, let down and opened. The chromium dioxide formed is mechanically removed from the reactor, and milled. It is then suspended in water which contains dissolved iron(II) sulfate in such amount that 2% by weight of the acicular $CrO_2$ is reduced to chromium-(III) oxide, this reduction taking place on the surface of the needles. After a residence time of 60 minutes, with stirring, the chromium dioxide suspension is filtered, and the soluble components are removed by washing. The $CrO_2$ filter residue is dried for 15 hours at 110° C.

The magnetic properties of the resulting chromium dioxide are measured by means of a vibrating sample magnetometer at a field strength of 160 kA/m, the tap density being 1.2 g/cm$^3$. The properties measured are the coercive force $H_c$ in kA/m, and the specific remanence $M_r/\rho$ and the specific saturation magnetization $M_s/\rho$ in nTm$^3$/g. The results of the measurements are shown in Table 1.

EXAMPLES 2 TO 11

The procedure described in Example 1 is followed, but with the various amounts and with the surface areas shown in Table 1. The results of the measurements are also shown in Table 1.

COMPARATIVE EXPERIMENTS 1 TO 4

The procedure described in Example 1 is followed, but with the various amounts and with the surface areas shown in Table 1. The results of the measurements are also shown in Table 1.

TABLE 1

|  | Examples | | | | | | | | | | | Comparative Experiments | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 1 | 2 | 3 | 4 |
| % by weight of $Sb_2O_3$ | 0.15 | 0.15 | 0.15 | 0.15 | 0.20 | 0.20 | 0.20 | 0.20 | 0.25 | 0.25 | 0.25 | 0.15 | 0.20 | 0.30 | 0.25 |
| specific surface area of the $Sb_2O_3$ (m$^2$/g) | 3.2 | 4.5 | 6.5 | 9.8 | 3.2 | 4.5 | 6.5 | 4.5 | 3.2 | 4.5 | 6.5 | 1.7 | 1.7 | 1.7 | 1.7 |
| % by weight of gamma-$Fe_2O_3$ | 0.30 | 0.30 | 0.30 | 0.30 | 0.50 | 0.50 | 0.50 | — | 1.20 | 1.20 | 1.20 | 0.30 | 0.50 | 0.30 | 1.20 |
| specific surface area of the gamma-$Fe_2O_3$ (m$^2$/g) | 15.4 | 15.4 | 15.4 | 15.4 | 15.4 | 15.4 | 15.4 | — | 15.4 | 15.4 | 15.4 | 15.4 | 15.4 | 15.4 | 15.4 |
| $H_c$ | 39 | 39.5 | 40.5 | 40.9 | 43.1 | 43.8 | 44.1 | 42.0 | 47.9 | 48.5 | 49.1 | 34 | 37.5 | 38.8 | 46.2 |
| $M_r/\rho$ | 43.5 | 43.0 | 43.2 | 43.1 | 42.9 | 43.1 | 43.5 | 43.9 | 41.8 | 41.5 | 41.4 | 43.0 | 44.1 | 43.3 | 42.0 |
| $M_s/\rho$ | 83.0 | 81.8 | 82.3 | 82.3 | 80.8 | 82.2 | 82.9 | 83.4 | 80.1 | 79.7 | 79.5 | 82.0 | 84.3 | 82.7 | 81.0 |

EXAMPLE 12

The chromium dioxide is produced as described in Example 1, but 1,065 g of chromium trioxide, 533 g of chromium(III) oxide, 417 g of water, 4.4 g of gamma-$Fe_2O_3$ and 2.8 g of antimony(III) oxide are employed. The last-mentioned contains 1.4 g, ie. 0.09% by weight, based on end product, of valentinite and an equal amount of senarmontite, having the specific surface areas mentioned in Table 2. The magnetic properties are also shown in Table 2.

EXAMPLE 13

The procedure described in Example 12 is followed, but 1.86 g of senarmontite and 0.93 g of valentinite are added to the reaction mixture. The other parameters and the results of the measurements are shown in Table 2.

COMPARATIVE EXPERIMENT 5

The procedure described in Example 13 is followed, but with only one-third of the antimony(III) oxide consisting of senarmontite, ie. 1.86 g of valentinite and 0.93 g of senarmontite. The other parameters and the results of the measurements are shown in Table 2.

COMPARATIVE EXPERIMENT 6

The chromium dioxide is prepared as described in Example 12, but only valentinite, namely 2.8 g, ie. 0.18% by weight based on end product, with a specific surface area of 0.9 m$^2$/g, is employed as the antimony(III) oxide. The other parameters and the results of the measurements are shown in Table 2.

COMPARATIVE EXPERIMENT 7

The procedure described in Comparative Experiment 6 is followed, except that the valentinite employed (2.8 g) has a specific surface area of 4.3 m$^2$/g. The other parameters and the results of the measurements are shown in Table 2.

COMPARATIVE EXPERIMENT 8

The procedure described in Comparative Experiment 6 is followed, except that 5.6 g of valentinite, having a specific surface area of 3.8 m$^2$/g, are employed. The other parameters and the results of the measurements are shown in Table 2.

EXAMPLE B1

115 parts of a chromium dioxide prepared as described in Example 1, 2 parts of zinc stearate, 1.5 parts of soybean lecithin, 3 parts of a mixture of fatty acids having a melting point of from 50° to 59° C., 110 parts of a mixture of equal parts of tetrahydrofuran and 1,4-dioxane, and 200 parts of a 15% strength binder solution, the solution having been prepared by dissolving 19.5 parts of an elastomeric, thermoplastic polyurethane (obtained, as described in German Published Application DAS No. 1,106,959, from adipic acid, 1,4-butanediol and 4,4'-diphenylisocyanatodiphenylmethane) and 10.5 parts of a vinyl chloride polymer, obtained from 80 parts of vinyl chloride and 10 parts of dimethyl maleate, in 170 parts of a mixture of equal parts of tetrahydrofuran and 1,4-dioxane, are introduced into a cylindrical steel ball mill, of 1,000 parts by volume capacity, which contains 1,000 parts of steel balls of diameter from 4 to 7 mm. The mixture is dispersed for 5 days, the resulting dispersion is filtered under pressure through a glass fiber/paper filter layer and the filtered dispersion is applied by means of a conventional knife coater to a 12 μm thick polyethylene terephthalate film in a such thickness that after drying and calendering a 5.1 μm thick dry layer results. However, immediately after applying the fluid dispersion, the acicular chromium dioxide particles are oriented in the recording direction by means of a magnetic field. The surface of the magnetic layer has an average peak-to-valley height Rz, measured according to DIN No. 4756, page 1, section 2.3.3, of 0.08–0.10 μm. The coated film is slit into 3.81 mm wide magnetic tapes.

TABLE 2

|  | Examples | | Comparative Experiments | | | |
| --- | --- | --- | --- | --- | --- | --- |
|  | 12 | 13 | 5 | 6 | 7 | 8 |
| Senarmontite, % by weight | 0.09 | 0.125 | 0.06 | — | — | — |
| Senarmontite, specific surface area | 3.2 | 3.2 | 3.2 | — | — | — |
| Valentinite, % by weight | 0.09 | 0.06 | 0.125 | 0.18 | 0.18 | 0.36 |
| Valentinite, specific surface area | 3.8 | 3.8 | 3.8 | 0.9 | 4.3 | 3.8 |
| Gamma-$Fe_2O_3$, % by weight | 0.3 | 0.3 | 0.3 | 0.3 | 0.3 | 0.3 |
| Gamma-$Fe_2O_3$, specific surface area | 15.4 | 15.4 | 15.4 | 15.4 | 15.4 | 15.4 |
| $H_c$ | 38.8 | 43.7 | 35.1 | 30.2 | 29.7 | 34.0 |
| $M_r/\rho$ | 49.2 | 50.0 | 48.6 | 48.7 | 48.2 | 48.7 |
| $M_s/\rho$ | 90.9 | 89.8 | 91.8 | 91.5 | 91.4 | 91.6 |

EXAMPLES B2 TO B11 AND BV1 TO BV4

The chromium dioxide samples obtained from Examples 2 to 11 and from Comparative Experiments 1 to 4 are used to produce magnetic recording media under the same conditions as those described in Example B1.

The magnetic tapes are tested as follows.

1. Magnetic Properties

The magnetic properties of the tapes are determined by means of a vibrating sample magnetometer at a field strength of 160 kA/m. The coercive force Hc in kA/m, the residual induction $M_s$ and the saturation magnetization $M_S$ in mT are measured, as is the orientation ratio Rf, namely the ratio of the residual induction in the direction of particle orientation to that at right angles thereto.

2. Electroacoustic Properties

The electroacoustic properties are measured in accordance with DIN 45,512, Sheet II, against chromium dioxide reference tape C 520-R, using an HF biassing current of 20 mA. All the electroacoustic properties, namely the maximum output level at long wavelengths AT at 1 kHz, the maximum output level at short wavelengths AH at 10 kHz, the reference level-to-weighted noise ratio RGA, and the signal-to-print-through ratio Ko, are based on reference tape C 520-R, which is taken to be equivalent to 0 db for all the parameters measured. Furthermore, the dynamic range at 1 kHz (DY 1) and at 10 kHz (DY 10) is determined.

The results of the measurements on all the magnetic tapes are given in Table 3.

TABLE 3

| | | H | $M_r$ | Rf | $A_T$ | $A_H$ | RGA | Ko | DY 1 | DY 10 |
|---|---|---|---|---|---|---|---|---|---|---|
| Example | B1 | 31.5 | 165 | 2.83 | +1.0 | +1.0 | +1.0 | +4.0 | +1.5 | +1.5 |
| | B2 | 39.8 | 160 | 2.72 | +0.5 | +1.1 | +1.3 | +3.5 | +1.8 | +2.4 |
| | B3 | 41.1 | 158 | 2.68 | 0 | +1.8 | +1.7 | +3.0 | +1.7 | +3.5 |
| | B4 | 41.5 | 156 | 2.62 | −0.2 | +1.9 | +1.9 | +1.8 | +1.7 | +3.8 |
| | B5 | 43.7 | 155 | 2.45 | −0.6 | +2.3 | +2.0 | +1.1 | +1.4 | +4.3 |
| | B6 | 44.2 | 153 | 2.41 | −0.8 | +2.5 | +2.2 | +0.9 | +1.4 | +4.7 |
| | B7 | 44.5 | 156 | 2.35 | −1.1 | +2.7 | +2.4 | +0.5 | +1.3 | +5.1 |
| | B8 | 42.4 | 151 | 2.38 | −0.5 | +1.7 | +2.1 | +0.5 | +1.6 | +9.9 |
| | B9 | 48.2 | 141 | 2.18 | −2.9 | +3.0 | +2.7 | −1.0 | +0.7 | +5.7 |
| | B10 | 48.9 | 138 | 2.10 | −2.2 | +3.3 | +3.0 | −1.3 | +0.8 | +6.3 |
| | B11 | 56.2 | 139 | 2.00 | −2.6 | +3.5 | +3.2 | −1.6 | +0.8 | +6.7 |
| Comparative Experiment | | | | | | | | | | |
| | BV1 | 34.6 | 166 | 2.80 | +1.5 | −1.0 | −1.5 | +1.0 | 0 | −0.5 |
| | BV2 | 38.1 | 161 | 2.71 | +1.0 | −0.2 | 0 | 0 | +1.0 | −0.2 |
| | BV3 | 39.3 | 157 | 2.65 | +0.5 | 0 | +0.2 | 0 | +0.7 | +0.2 |
| | BV4 | 42.7 | 156 | 2.41 | −0.3 | +1.7 | +0.5 | −1.0 | +0.2 | +2.3 |

We claim:

1. A process for the manufacture of ferromagnetic chromium dioxide by reacting oxides of trivalent and hexavalent chromium under a pressure of from 100 to 700 bar at a temperature from 200°–600° C. in the presence of water and of antimony(III) oxide as modifier, with or without other modifiers in an amount not exceeding 15% by weight, wherein the antimony(III) oxide employed as modifier is, to the extent of more than one-third of the antimony(III) oxide, present as the senarmontite cubic modification, has a specific surface area, measured by the BET method, of from 2.5 to 15 m²/g, and is added in an amount of from 0.1 to 0.5% by weight, based on the resulting chromium dioxide.

2. A process as claimed in claim 1, wherein the antimony(III) oxide employed as modifier consists to the extent of at least 98% of senarmontite having a specific surface area, measured by the BET method, of from 3 to 10 m²/g.

3. A process as claimed in claim 1 or 2, wherein acicular iron oxide particles in the form of alpha-FeOOH are employed, as additional modifier, in an amount of from 0.5 to 15% by weight, based on chromium dioxide.

4. A process as claimed in claim 1 or 2, wherein acicular iron oxide particles in the form of gamma-$Fe_2O_3$ are employed, as additional modifier, in an amount of from 0.5 to 15% by weight, based on chromium dioxide.

* * * * *